(12) United States Patent
Sterte et al.

(10) Patent No.: US 6,177,373 B1
(45) Date of Patent: Jan. 23, 2001

(54) PROCEDURE FOR PREPARING MOLECULAR SIEVE FILMS

(75) Inventors: Per Johan Sterte; Jonas Hedlund, both of Lulea (SE); Brian J. Schoeman, Midland, MI (US)

(73) Assignee: Exxon Chemicals Patents Inc, Houston, TX (US)

( * ) Notice: Under 35 U.S.C. 154(b), the term of this patent shall be extended for 0 days.

(21) Appl. No.: 09/142,838

(22) PCT Filed: Mar. 13, 1997

(86) PCT No.: PCT/EP97/01267

§ 371 Date: Feb. 8, 1999

§ 102(e) Date: Feb. 8, 1999

(87) PCT Pub. No.: WO97/33684

PCT Pub. Date: Sep. 18, 1997

(30) Foreign Application Priority Data

Mar. 14, 1996 (SE) .................................... 9600970

(51) Int. Cl.$^7$ .................................... B01J 20/28
(52) U.S. Cl. .................................... 502/4; 502/60; 502/64
(58) Field of Search .................................... 502/4, 60, 64

(56) References Cited

U.S. PATENT DOCUMENTS

| | | | | |
|---|---|---|---|---|
| 4,578,372 | * | 3/1986 | Hoving et al. | ............... 502/74 |
| 5,310,714 | * | 5/1994 | Grasselli et al. | ............... 502/64 |
| 5,413,975 | * | 5/1995 | Meuller et al. | ............... 502/60 |
| 5,429,743 | | 7/1995 | Geus et al. . | |
| 5,573,121 | * | 11/1996 | Gues et al. | ............... 210/490 |

FOREIGN PATENT DOCUMENTS

| | | |
|---|---|---|
| 0270212 | 6/1988 | (EP) . |
| 07109116 | 4/1995 | (JP) . |
| 7-109116 | * 4/1995 | (JP) . |
| 9405597 | * 3/1994 | (WO) . |

* cited by examiner

*Primary Examiner*—Tom Dunn
(74) *Attorney, Agent, or Firm*—Edward F. Sherer

(57) ABSTRACT

The invention is comprised of a procedure for applying molecular sieve films to the surface of different substrates. This procedure is characterized in that microcrystals of the molecular sieves in question bind to the substrate surface in a first step as a monolayer, and are then, in a second step, allowed to grow into a thin, continuous and dense film. Molecular sieve films are of interest in application areas such as preparing membranes, catalysts, sensor devices and polymer reinforcing fillers.

44 Claims, 2 Drawing Sheets

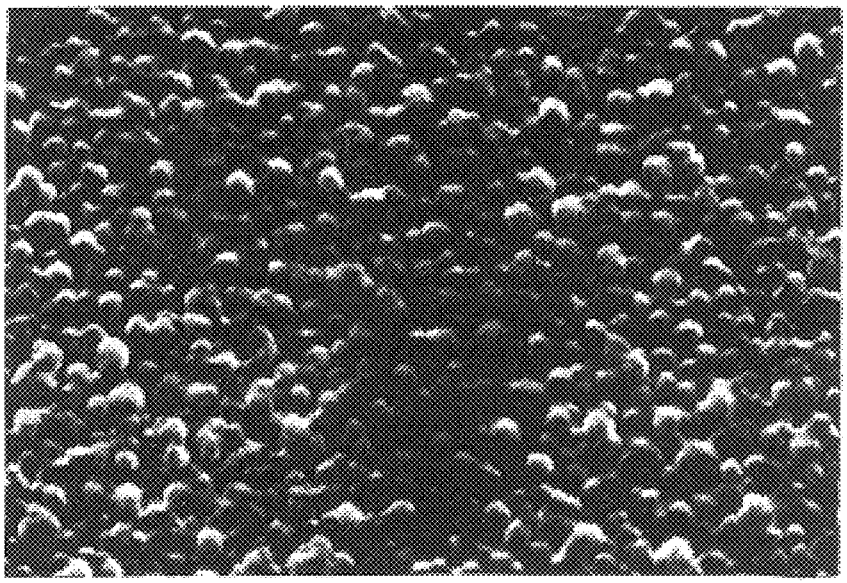
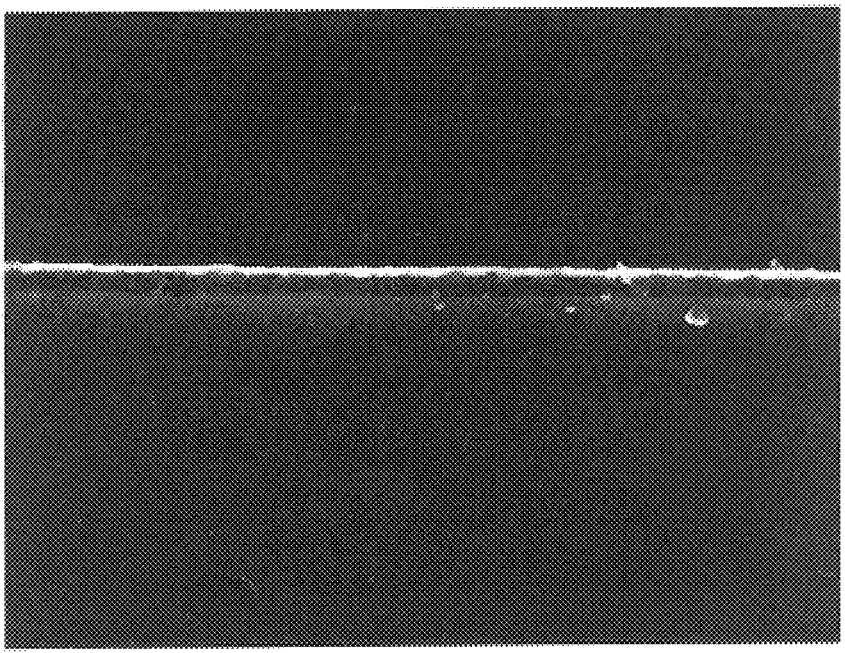

FIG.3
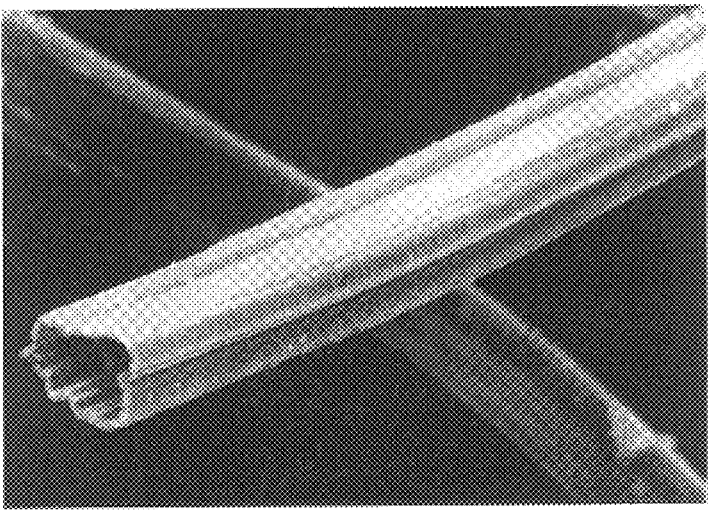
SILICALIT-1
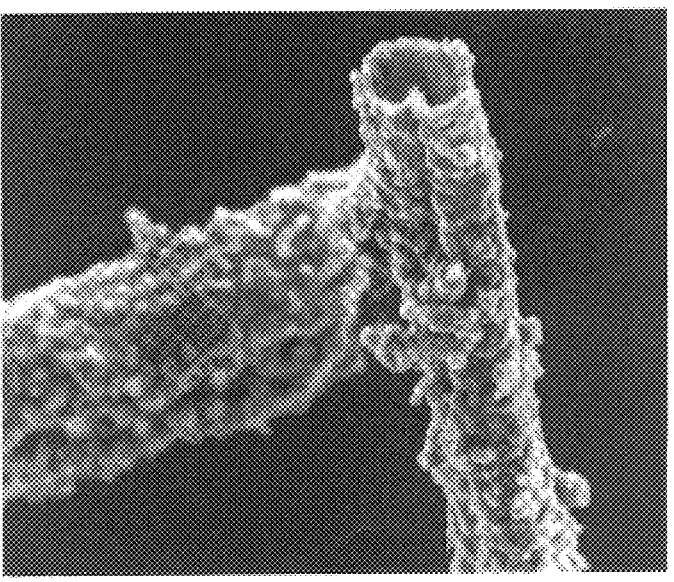
ZEOLIT Y

PROCEDURE FOR PREPARING MOLECULAR SIEVE FILMS

The present invention is concerned with a method for preparing molecular sieve films on a variety of substrates. Substrates coated with such thin films find their applications in the fields of membrane separation, sensor technology, catalysis, electrochemistry, electronics as well as reinforcing polymer fillers.

Molecular sieves are characterized by the fact that they are microporous materials with pores of a well-defined size in the range of 2–20 A. Most molecules, whether in the gas or liquid phase, both inorganic and organic, have dimensions that fall within this range at room temperature. Selecting a molecular sieve with a suitable pore size therefore allows separation of a molecule from a mixture through selective adsorption, hence the name "molecular sieve". Apart from the selective adsorption and selective separation of uncharged species, the well-defined pore system of the molecular sieve enables selective ion exchange of charged species and selective catalysis. In the latter two cases, significant properties other than the micropore structure are, for instance, ion exchange capacity, specific surface area and acidity. Molecular sieves can be classified in various categories, for example according to their chemical composition and their structural properties. A group of molecular sieves of commercial interest is the group comprising the zeolites, that are defined as crystalline aluminium silicates. Another category of interest is that of the metal silicates, structurally analogous to zeolites, but for the fact that they do not contain aluminium or only very small amounts thereof). An excellent review of molecular sieves is given in "Molecular Sieves—Principles of Synthesis and Identification" (R. Szostak, Van Reinhold, New York, 1989).

Membrane processes for selective separation have attracted considerable interest, partly due to the fact that they are potentially more effective and more economically advantageous as compared to the currently used separation processes, and partly due to the fact that they may open up new separation possibilities, that are not feasible with the currently available techniques. There is also considerable interest in the development of catalytic membrane reactors and chemical sensors with improved selectivity. The limitations associated with the use of membranes in various applications are primarily due to the membrane itself. The performance of the currently available membrane materials is generally less than optimal as regards capacity, selectivity, thermal and mechanical properties as well as resistance to biodegradation. It is known that significant improvements can be obtained with zeolite based membranes.

Membranes consisting solely of molecular sieve material are known and reported in various patents and publications. Suzuki (Europ. Pat. Appli. 180200 (1986)) describes a method for preparing a zeolite membrane by applying a gel coat to a substrate, followed by hydrothermal treatment of the gel coat to form a zeolite film. In another method (U.S. Pat. No. 4,699,892 (1987)), a substrate is first impregnated with a synthesis gel that is subsequently transformed into zeolite under hydrothermal synthesis conditions. U.S. Pat. No. 4,800,187 (1989) describes a method in which these zeolite films are prepared by reacting the substrate surface with active silica.

In International Application WO 94125151, a supported inorganic layer comprising optionally contiguous particles of a crystalline molecular sieve is deposited, the mean particle size being within the range of from 20 nm to 1 $\mu$m. The support is advantageously porous. When the pores of the support are covered to the extent that they are effectively closed, and the support is continuous, a molecular sieve membrane results; such membranes have the advantage that they may perform catalysis and separation simultaneously if desired. While the products of this earlier application are effective in many separation processes, the crystals of the layer are not ordered, and as a result diffusion of materials through the membrane may be hampered by grain boundaries and voids between the crystals effect selectivity.

International Applications PCT/EP93101209, and PCT/US95/08514 published as WO 96/01687 describe the use of nucleation layers deposited on substrates for the manufacture of molecular sieve layers. These nucleation layers are relatively thick and unordered and the molecular sieve layers are relatively thick.

In International Application PCT/US95/08511 published as WO 96/01685 molecular sieve layers are synthesised without the use of a nucleation layer. The resultant molecular sieve layer is relatively thick from 2 to 100 $\mu$m. This process produces molecular sieve layers which have a relatively low density of molecular sieve at the interface with the substrate.

Furthermore considerable interest has been shown for the development of new and improved composite materials consisting primarily of fibrous inorganic materials in combination with various types of polymers and plastics. In order to obtain advantageous mechanical properties of the composites, efforts are made to ensure compatibility, and where appropriate create the best chemical bonds, between fibers and polymers. For inorganic fibers, this may be achieved by using suitable coupling agents, that is, compounds characterized by the fact that they contain functional groups with a strong affinity towards both the fiber and the polymer. Several methods have been developed to achieve this aim. It is also known that certain types of inorganic molecular sieves show a strong affinity towards organic compounds, such as the monomers used in the production of polymers, and it is known that fibers coated with molecular sieves can impart reinforcing properties when used as fillers in polymer matrixes.

It is possible to prepare continuous molecular sieve films with the techniques known in the art. However, such films have dimensions with a lower thickness limit range of more than 1–10 micrometers, the exact limit depending on the type of molecular sieve being used. Attempts to prepare thinner films with the current available techniques result in discontinuous films, of very limited use in the current fields of application. For example with prior art molecular sieve structures for use in separations there may be restrictions on the flow of material through the membrane due to the presence of flux limiting attributes of the structure and/or there may be defects in the membrane which contribute to non-selective pathways through the membrane. Efforts however are being made to prepare even thinner films, because of the technical advantages such films would offer in several potential applications. However when moving to very thin membranes such problems are compounded; some prior art techniques as indicated above provide low density membrane structures at the interface with the substrate which may only be overcome by the use of thicker membranes or extensive reparation of the membrane. For the use of molecular sieve films as membranes in separation processes, the membrane flux is primarily influenced by the film thickness. The thinner the membrane, the higher the flux. For application as a chemical sensor, the response time is of prime importance. For a given molecular sieve, the response time is shortened by reducing the film thickness. In catalytic processes, the efforts are directed towards avoiding low reaction rates due to limited diffusion transport of species in the catalyst. In catalytic membrane reactors where the molecular sieve is the active phase, the resistance to pore diffusion is lowered as the film thickness is reduced.

It is often desirable to produce thin films of inorganic materials that are crack-free and in most cases this is a prerequisite. For preparing thin films of inorganic materials, it is often desirable and, in many cases required, for use in the envisaged applications, to have films that are free of cracks and large pores. With the currently available techniques, it is difficult to produce zeolite films that are crack-free both immediately after production and after exposure to high temperatures.

Another problem associated with the production of membranes via the formation of molecular sieve films on porous substrates according to the known techniques, is blocking of the substrate pore system due to deposits of molecular sieve material in this pore system, causing an effectively thicker film to be made.

A further problem associated with the production of molecular sieve films on substrates according to the known techniques is that in practice the number of possible substrate/molecular sieve combinations is limited by the fact that the conditions required for synthesizing numerous molecular sieves are so severe that the substrate is dissolved or etched.

A problem with the use of fibers in composite materials or as fillers in polymers and plastics is the low degree of compatibility between polymer and filler, ultimately resulting In a material with unsatisfactory mechanical properties. However, this compatibility problem can be wholly or partly overcome by using known techniques, but only at the expense of significantly increased production costs.

The present invention provides a means for avoiding the problems associated with the known procedures for preparing molecular sieve films on substrates and describes a new procedure for preparing molecular sieve films on substrates especially very thin films.

A purpose of the present invention is to avoid the disadvantages associated with the known methods used for preparing molecular sieve films and to present a new procedure allowing to prepare in particular very thin continuous films of this type. Another purpose of the present invention is to develop a procedure for depositing very thin molecular sieve films on the surface of a porous substrate without simultaneously blocking the substrate pores by depositing molecular sieve material in those pores. A further purpose of the present invention is to develop a procedure whereby it is possible to prepare very thin molecular sieve films on substrates that are likely to dissolve or be etched under the conditions normally employed for synthesizing the molecular sieve in question. It is also the purpose of the present invention to develop a procedure for preparing very thin molecular sieve films that are crack-free both immediately after preparation and after thermal treatment.

It is further the purpose of the present invention to be able to apply the prepared very thin molecular sieve films to both flat and fibrous substrates.

The present invention deals with a procedure for preparing molecular sieve films, especially very thin films, in which procedure discrete molecular sieve microcrystals are bound to the surface of a support to form a monolayer comprising molecular sieve microcrystals, which is subsequently made to grow into a continuous film of molecular sieve.

The key aspect in the process of the present invention is the formation of an intermediate product which comprises as a key component a monolayer comprising molecular sieve microcrystals on a suitable support.

The present invention therefore in a first aspect provides a molecular sieve monolayer structure which comprises;
 a) a substrate and deposited thereon
 b) a monolayer comprising molecular sieve microcrystals.

The term monolayer in the context of the present invention is taken to mean a layer comprising microcrystals which are substantially in the same plane deposited on a substrate. The microcrystals and other materials if present may be close packed to provide a classical monolayer. Alternatively the microcrystals and other materials if present are not close packed and therefore are present as a sub-monolayer. The exact packing density required depends to a certain degree on the nature of the molecular sieve microcrystals and the desired molecular sieve film to be grown from these microcrystals. The packing density of microcrystals in the monolayer should in any event be such as to enable a thin layer of molecular sieve film to be grown from the layer. If the microcrystals are of an Inadequate density in the monolayer the growth of molecular sieve film crystals from such a monolayer to ensure a dense molecular sieve film would be such as to provide a thick molecular sieve film.

The present invention in a second aspect provides for a method of preparing a monolayer structure comprising molecular sieve microcrystals which method comprises;
 a) preparing a dispersion comprising discrete microcrystals of molecular sieve which have a surface charge,
 b) selecting or preparing a substrate with a surface charge which is opposite to that of the discrete microcrystals in the dispersion,
 c) contacting the substrate with the dispersion comprising discrete microcrystals of molecular sieve such that discrete microcrystals of molecular sieve are attracted to and adhere to the substrate as a monolayer.

The present invention in a third aspect provides a method of preparing a structure comprising a molecular sieve film which method comprises;
 a) depositing on a substrate a monolayer comprising molecular sieve microcrystals which are capable of nucleating the growth of a molecular sieve film,
 b) forming a molecular sieve synthesis solution,
 c) contacting a) and b) and hydrothermally growing molecular sieve to form a molecular sieve film on the substrate.

The present invention in a fourth aspect provides a structure comprising a support and a film comprising a crystalline molecular sieve in wherein the molecular sieve film has incorporated within its structure a monolayer comprising molecular sieve microcrystals.

The present invention is particularly suitable for the production of very thin molecular sieve films. By the term very thin films is meant films with a thickness of less than 2 $\mu$m, ideally less than 1 $\mu$m, preferably less than 0.25 $\mu$m and most preferably less than 0.1 $\mu$m.

The term microcrystal as used in the relation to the present invention refers to molecular sieve crystals with a size of less than 500 nm preferably less than 200 nm, the crystal structure of which can be identified by X-ray diffraction.

International Application PCT/SE93/00715 published as WO 94/05597, the teaching of which is hearby incorporated by reference, describes a method whereby it is possible to synthesize colloidal suspensions of discrete molecular sieve microcrystals suitable for use in the preparation of monolayer structures according to the present invention. Molecular sieves such as zeolites or crystalline microporous metal silicates are generally synthesized by hydrothermal treatment of a silicate solution with a well-defined composition. This composition, as well as the synthesis parameters such as temperature, time and pressure, determine the type of product and the crystal shape obtained.

Suitable molecular sieve microcrystals for use in the present invention include nanocrystalline zeolites which are crystallites having sizes from about 10 Å to 1 μm. Nanocrystalline zeolites can, e.g., be prepared in accordance with the methods set forth in PCT-EP92-02386 published as WO 93/08125 the teaching of which is hereby incorporated by reference, or other methods known to those skilled in the art. Colloidal sized particles are between 50 and 10,000 Å and form a stable dispersion or solution of discrete particles. Preferably, the colloidal particles will be 250 to 5,000 Å, most preferably less than 1000 Å. Colloidal zeolites with sizes <5000 Å are readily obtainable. Following calcination the zeolite will be nanocrystalline or colloidal sized zeolite. Representative of molecular sieves (zeolites) which can be used include but are not limited to those of structure types AFI, AEL, BEA, CHA, EUO, FAU, FER, KFI, LTA, LTL, MAZ, MOR, MEL, MTN, MTT, MTW, OFF, TON includes zeolite X and zeolite Y) zeolite beta and especially MFI zeolites. Preferably, a MFI zeolite with a silicon to aluminium ratio greater than 30 will be used including compositions with no aluminium. MFI zeolites with Si/Al ratios greater than 300 are herein referred to as silicate. Some of the above materials, while not being true zeolites are frequently referred to in the literature as such, and the term zeolite will herein be used broadly to include such materials.

A synthesis mixture to form the molecular sieve microcrystals that are advantageously applied to the support is advantageously prepared by the process described in International Application WO93/08125. In that process, a synthesis mixture is prepared by boiling an aqueous solution of a silica source and an organic structure directing agent in a proportion sufficient to cause substantially complete dissolution of the silica source. The organic structure directing agent, if used, is advantageously introduced into the synthesis mixture in the form of a base, specifically in the form of a hydroxide, or in the form of a salt, e.g. a halide, especially a bromide. Mixtures of a base and a salt thereof may be used, if desired or required, to adjust the pH of the mixture.

Other suitable molecular sieve microcrystals may be prepared by the methods described in PCT/EP96103096, PCT/EP96/03097, and PCT/EP96/0309698, the disclosures of which are hereby incorporated by reference.

The structure directing agent may be, for example, the hydroxide or salt of tetramethylammonium (TMA), tetraethylammonium (TEA), triethylmethylammonium (TEMA), tetrapropylammonium (TPA), tetrabutylammonium (TBA), tetrabutylphosphonium (TBP), trimethylbenzylammonium ITMEA), trimethylcetylammonium (TMCA), trimethyineopentylammonium (TMNA), triphenylbenzylphosphonium (TPBP), bispyrrolidinium (BP), ethylpyridinium (EP), diethylpiperidinium (DEPP) or a substituted azoniabicyclooctane, e.g. methyl or ethyl substituted quinuclidine or 1,4-diazoniabicyclo-(2,2,2)octane. 1,6-diaminohexane, 1,8-diaminooctane, or a crown ether may also be used.

Preferred structure directing agents are the hydroxides and halides of TMA, TEA, TPA and TBA.

The monolayer of the present invention may further comprise additional materials such as silica and/or metal oxide; metal particles; metal particles with metal oxides and/or silica. The monolayer may be formed from a solution containing a nanocrystalline or colloidal zeolite or a mixture of metal oxide and nanocrystalline or colloidal zeolite or a mixture of nanocrystalline or colloidal zeolite and colloidal metal. Preferably, nanocrystalline or colloidal zeolite or a mixture of nanocrystalline or colloidal zeolite and metal oxide will be used to form the monolayer layer. The metal oxides from which the monolayer is prepared are colloidal metal oxides or polymeric metal oxides prepared from sol-gel processing. In this aspect of the present invention the metal oxides which can be used herein are selected from the group consisting of colloidal alumina, colloidal silica, colloidal zirconia, colloidal titania and polymeric metal oxides prepared from sol-gel processing and mixtures thereof. Preferably colloidal alumina will be used. The colloidal metals which can be used include copper, platinum and silver. If used these additional materials must also have the required surface charge in relation to the substrate.

By adjusting the ratio of colloidal zeolite and metal oxide, the density of nucleation sites on the monolayer can be controlled. This density controls the morphology of the zeolite film grown over this layer in a subsequent hydrothermal synthesis step. The higher the nucleation density, the narrower the molecular sieve crystal width the crystals will exhibit at the molecular sieve film/substrate interface. Nucleation density can be controlled by the relative proportions of microcrystals and metal oxides (with the density decreasing as the amount of the metal oxide utilised increases) as well as the size of the microcrystals in the monolayer. Microcrystals in the range of 50–10,000 Å are thus used in this layer. The larger the microcrystals utilised in this layer, the wider the zeolite crystals in the upper layer will be. It is If preferred that the monolayer consists substantially of molecular sieve microcrystals and most preferably that these molecular sieve microcrystals are zeolite crystals and are colloidal in nature preferably less than 100 nm.

The first step in preparing molecular sieve films according to the present invention entails bonding to the substrate surface of one or more nearly continuous monolayers of discrete microcrystals that will ultimately form and become an integral part of the molecular sieve film. To obtain the best results, at the time of deposition, the microcrystals should form discrete entities and not aggregates consisting of several particles.

Advantageously, the crystal size of the molecular sieve microcrystals in the monolayer is at most 500 nm preferably at most 300 nm, ideally within the range 10 to 300 nm, 20 to 200 nm and most preferably 20 to 120 nm.

Advantageously the size of the additional particles if present are the same or similar to that of the molecular sieve microcrystals.

A key aspect of this stage of the process is the selection or preparation of the substrate onto which the monolayer is to be deposited.

Selection of the appropriate substrate assumes that the substrate surface has or may be imparted a surface charge that is sufficiently strong and of the opposite sign to that of the species to be adsorbed. The majority of the molecular sieves of interest in the present invention are metal silicates, that may be characterized as having a negative charge in neutral or alkaline aqueous suspensions. The magnitude of the surface charge is generally at its highest in the pH range 8–12 and hence this pH range is suitable for adsorbing microcrystals onto substrate surfaces.

Certain types of molecular sieves are prepared in the presence of tetraalkyl ammonium ions in stoechiometric excess. In such cases, the adsorption on several types of surfaces is promoted if the excess tetraalkyl ammonium ions are replaced by, for instance, ammonium ions. This may be achieved by allowing the microcrystal suspension to pass through a column packed with an organic ion exchange resin in the ammonium form, or by adding ion exchange resin in such form to a microcrystals containing suspension and, after complete ion exchange, separating the ion exchange resin from the suspension through for example filtration or centrifugation.

The support for use in the present invention may be may be either non-porous or porous. As examples of non-porous support there may be mentioned glass, fused quartz, and silica, silicon, dense ceramic, for example, clay, and metals. As examples of porous supports, there may be mentioned porous glass, sintered porous metals, e.g., steel or nickel or precious metals, and, especially, an inorganic oxide, e.g., alpha-alumina, titania, an alumina/zirconia mixture, Cordierite, or zeolite as herein defined.

Examples of substrates that are of major interest for coating with thin molecular sieve films, in order to be used in the field of sensor technology include solid silicon wafers, quartz, aluminium oxide, aluminium silicate and precious metals. Porous aluminium oxide, silica, aluminium silicate, sintered metal and polymer substrates are examples of materials that may be used for preparing membranes for separation processes and, to a certain extent, catalytic membranes. Within the electrochemistry and electronics application fields, metal and alloy substrates are of prime interest. Examples of fibrous materials that may be coated according to the procedures described in the present invention include glass fibers, ceramic fibers, carbon fibers, graphite fibers, cellulose fibers and various polymer fibers. All the above mentioned substrates may be produced according to known methods and certain substrates are commercially available.

The support may be any material compatible with the monolayer deposition and film synthesis techniques, as described, for example below, e.g., porous alpha-alumina with a surface pore size within the range of from 0.004 to 100 $\mu$m, more advantageously 0.05 to 10 $\mu$m, preferably from 0.08 to 1 $\mu$m, most preferably from 0.08 to 0.16 $\mu$m, and advantageously with a narrow pore size distribution. The support may be multilayered; for example, to improve the mass transfer characteristics of the support, only the surface region of the support in contact with the monolayer may have small diameter pores, while the bulk of the support, toward the surface remote from the layer, may have large diameter pores. An example of such a multilayer support is an alpha-alumina disk having pores of about 1 $\mu$m diameter coated with a layer of alpha-alumina with pore size about 0.08 $\mu$m.

For building up films on porous substrates, it is often advantageous to choose the microcrystal size or the porosity of the support so that microcrystal size is slightly larger than the substrate pores, to avoid forming a film in the substrate pore structure and blocking the substrate pore system.

Many substrates of interest for the preparation of thin molecular sieve films according to the present invention are oxides or have a surface covered with an oxide layer, which means that the substrate also has a negative charge in an aqueous suspension in the pH range of interest. In such cases, to make the substrate surface suitable for adsorbing negatively charged microcrystals, it may be charge reversed to obtain a positive charge. Such a charge reversal can be achieved by treating the substrate with a solution containing 0.1–4 weight % cationic polymer. The pH value for the charge reversal is selected after considering both the substrate and the polymer chemistry. However, cationic polymers may be used within a wide pH range. The repeat unit in such polymers can be quaternary amines with hydroxyl groups in the main chain. An example of such a polymer is Berocell 6100, a water soluble polymer with a repeat unit $[CH_2CH(OH)CH_2N(CH_3)_2]_n^+$ and a molecular weight of 50,000 g/mol, marketed by Akzo Nobel AB, Sweden. Other suitable polymers a well known in the art.

An alternative, but less preferred method, is to charge reverse the molecular sieve microcrystals instead of the substrate surface. This may be achieved according to known methods, similar to those used for charge reversing the substrate.

For certain substrates it may be advantageous, in order to impart to them satisfactory surface properties, to submit them to one or more pretreatment steps, aimed at cleaning their surface or modifying their surface chemistry. In such cases, it is advantageous to treat the substrate in one or more alkaline, acid or oxidizing cleaning steps, or combinations of such steps. Adsorption of molecular sieves on quartz and aluminium oxide is often promoted by a treatment of the substrates involving deposing a thin silica layer, that provides a surface with a high hydroxyl group density and higher surface charge density under the conditions where the adsorption takes place. Another way of enhancing microcrystal deposit is to carry out the adsorption in two or more steps, as the case may be, with an intermediate charge reversal. For certain substrate types, that may be of interest for coating with very thin zeolite films according to the present invention, the procedure described above for depositing a more or less complete microcrystal monolayer is not satisfactory, since it is not possible to achieve a sufficiently high surface charge on the substrate surface. Examples of such surfaces are precious metals and the majority of the organic polymers. In such cases coupling agents, for instance of the silane type, may be used according to known techniques. Such coupling agents are characterized by the fact that they consist of two functional groups, one of them having affinity for the substrate surface and the second one binding to the microcrystal surface. For bonding zeolite or metal silicate microcrystals to precious metal surfaces, a silane containing a thiol group is often suitable. Coupling agents are made by for example Dow Corning and Union Carbide and they are generally used for incorporating inorganic fillers and reinforcing agents into organic polymers. The coupling agent may be deposited on the substrate and then hydrolised to provide the required surface charge or it may have inherent functionality which provides the required charge. Suitable coupling agents are chemicals which are well known in the art such as those supplied by OSi specialties is "Silquest Silanes" and as indicated in their 1994 brochure for these products. The coupling agent may be utilised in conjunction with the cationic polymers as indicated above to provide the required surface charge. Thus the charge reversal or control may be achieved by; utilisation of the appropriate pH of the solution into which the substrate is immersed and which contains the microcrystals to induce opposite charges on crystals and substrate surface; deposition of a cationic polymer which imparts appropriate charge reversal in relation to the microcrystals; or utilisation of a coupling agent with or without hydrolysis and/or with a suitable cationic polymer.

The monolayer deposition process may be repeated a number of times in order to ensure the complete formation of a true monolayer or to achieve the desired density of coverage of the substrate surface with a sub-monolayer.

In one aspect of the present invention the support with monolayer deposited thereon is placed in the synthesis mixture without any further treatment of the monolayer. Even when submerged in the synthesis mixture, the microcrystals of the monolayer remain adhered to the support and facilitate growth of the molecular sieve film. However, under some circumstances, e.g. during stirring or agitation of the synthesis mixture during hydrothermal synthesis, the adhesion between the particles and the support may be insufficient and steps must be taken to stabilise the monolayer and fix its position.

Preferably therefore the monolayer is stabilised or fixed in place before being placed into the synthesis mixture. This stabilisation can be achieved in one aspect by heat-treating the monolayer, e.g. at temperatures between 30 and 1000° C., preferably greater than 50° C. and more preferably between 200° C. and 1000° C. and most preferably greater than 300° C. A preferred range would be 400 to 600° C. This heat treating is for preferably at least two hours with or without steam.

In an alternative method of stabilisation the monolayer may be treated with a solution that modifies the surface characteristics of the microcrystals in the monolayer. For example, the layer may be washed with a solution that would cause the microcrystal particles in the monolayer to flocculate; without wishing to be bound by theory it is believed that a processes similar to flocculation in colloidal solutions may also bind the microcrystals in the monolayers more strongly together. Suitable solutions include those which comprise materials which will ion-exchange with the monolayer. These include solutions of divalent metal ions such as for example solutions comprising alkaline earth metal salts. As an example, a wash with a diluted Ca salt e.g. $CaCl_2$ solution may be mentioned. In this aspect there may be included the additional step of heating of the treated layer at a temperature of up to 300° C. and preferably up to 200° C. Those skilled in the art will appreciate that many other solutions or treatments may be used to stabilise the monolayer.

The monolayer structure of the present invention is utilised in the manufacture of a molecular sieve film according to the present invention. In this process the monolayer structure is contacted with a synthesis solution for the required molecular sieve.

In the manufacture of molecular sieve films according to the present invention, the deposited microcrystals are allowed to grow on the substrate surface. The growth of the initially discrete crystals leads to their intermeshing and the more or less complete discrete microcrystal monolayer is transformed into a continuous and dense molecular sieve film on the substrate surface. The thickness of the thinnest film necessary to obtain a continuous and dense film is dictated by both the size of the deposited crystals and the degree of close-packing of such crystals on the substrate surface and their orientation on the substrate surface. With maximum close-packing, it is In most cases sufficient to grow the crystals to a film thickness corresponding to one and a half times the thickness of the monolayer which when the crystals are approximately spherical corresponds to one and a half times the diameter of the initially deposited crystals, in order to obtain a continuous and crack-free film. When the crystals have a geometric shape other than spherical then they may be deposited on the substrate to form a monolayer which consists of crystals which are oriented and may also be close packed. In this case the faces of the crystals which are in a plane other than the plane of the monolayer surface may in fact be the faces of the crystals from which the new molecular sieve growth is greatest for film formation. The result of this arrangement is that the crystals in the monolayer grow from these faces towards each other and form a dense thin film with little or no growth from the surface plane of the monolayer. Thus in this case a sufficiently dense film may be produced which has a thickness which corresponds substantially to the thickness of the original monolayer.

The molecular sieve film is formed by placing the substrate with the adsorbed-molecular sieve microcrystals in a solution with a composition suitable for synthesizing the desired molecular sieve, and subsequently processing it under conditions suitable for synthesizing the desired molecular sieve. Since most molecular sieve synthesis takes place in gels and not in solutions, it should be stressed that the procedure according to the present invention is applicable in cases where crystallization is preferably achieved in a clear solution. In such case, the solution used leads to crystallisation of the molecular sieve in question, even in the absence of substrate.

The composition of the synthesis mixture varies according to the process; the mixture often contains a source of silicon, and usually contains a structure directing agent, for example one of those mentioned above, and a source of any other component desired in the resulting zeolite. In some processes according to the invention, a source of potassium is required. A preferred silicon source is colloidal silica, especially an ammonia-stabilised colloidal silica, e.g., that available from du Pont under the trade mark Ludox AS-40.

The source of silicon may also be the source of potassium, in the form of potassium silicate. Such a silicate is conveniently in the form of an aqueous solution such, for example, as sold by Aremco Products, Inc. under the trade mark CERAMA-BIND, which is available as a solution of pH 11.3, specific gravity 1.26, and viscosity 40 mPas. Other sources of silicon include, for example, silicic acid.

As other sources of potassium, when present, there may be mentioned the hydroxide. Whether or not the synthesis mixture contains a potassium source, it may also contain sodium hydroxide to give the desired alkalinity.

The structure directing agent, when present, may be any of those listed above for the synthesis mixture for forming the intermediate layer crystals.

Suitable molecular sieve synthesis solutions are well known in the art and are described in for example In International Application WO 94/25151, International Application PCT/EP93/01209, International Application PCT/US95/08514 published as WO 96/01687 and International Application PCT/US95/08511 published as WO 96/01685, the teachings of which are all incorporated herein by reference.

As molecular sieves for the molecular sieve film, there may be mentioned a silicate, an aluminosilicate, an aluminophosphate, a silicoaluminophosphate, a metalloaluminophosphate, or a metalloaluminophosphosilicate.

The preferred molecular sieve will depend on the chosen application, for example, separation, catalytic applications, and combined reaction and separation, and on the size of the molecules being treated. There are many known ways to tailor the properties of the molecular sieves, for example, structure type, chemical composition, ion-exchange, and activation procedures.

Representative examples are molecular sieves/zeolites of the structure types AFI, AEL, BEA, CHA, EUO, FAU, FER, KFI, LTA, LTL, MAZ, MOR, MEL, MTT, MTW, OFF, TON and, especially, MFI. Some of these materials while not being true zeolites are frequently referred to in the literature as such, and this term will be used broadly in the specification below. Examples of molecular sieves that are of major interest for the present invention include silicalite, hydroxysodalite, TS-1 as well as the zeolites A, Beta, L, X, Y, ZSM-2, ZSM-1 1, ZSM-22, ZSM-5, and SAPO-34.

For the manufacture of an MFI type zeolite, especially ZSM-5 or silicalite e.g silicalite-1, the synthesis mixture is advantageously of a molar composition, calculated in terms of oxides, within the ranges:

| | |
|---|---|
| $M_2O:SiO_2$ | 0 to 0.7 to:1 preferably 0.016 to 0.350:1 |
| $SiO_2:Al_2O_3$ | 12 to infinity:1 |
| $(TPA)_2O:SiO_2$ | 0 to 0.2:1 preferably 0 to 0.075:1 |
| $H_2O:SiO_2$ | 7 to 1000:1 preferably 9 to 300:1 | wherein TPA represents tetrapropylammonium and M an alkali metal, preferably sodium or potassium, also Li, Cs and ammonia. Other template agents may be used in these ratios. For the manufacture of an MFI layer, a tetrapropylammonium hydroxide or halide is preferably used.

In this specification ratios with infinity as the value indicate that one of the ratio materials is not present in the mixture.

The process described above when using specific amounts of sodium generally results in an MFI zeolite layer in which the CPO (as defined below) is such that the crystallographic c-axis is perpendicular to the plane of the layer. In the MFI structure, the channel system comprising straight channels, which lie parallel to the b-axis, and sinusoidal channels, which lie parallel to the a-axis, lies parallel to the plane of the layer.

Contacting of the coated support is advantageously carried out by immersion or partial immersion and with the support in an orientation and location in the synthesis mixture such that the influence of settling of crystals formed in the reaction mixture itself, rather than on the coated surface, is minimised. For example, the surface to be coated is advantageously at least 5 mm, and preferably at least 8 mm, from a wall or, especially, the base, of the vessel to avoid interference from crystals settling and local depletion of the mixture by a high concentration of growing crystals. Further, the coated surface is advantageously oriented at an angle within the range of from 90° to 270°, preferably 180°, 180° representing the coating surface horizontal and facing downward. Especially if the coated surface of the structure is three dimensional, e.g., a honeycomb, other means may be used to inhibit settling, for example, agitation, stirring or pumping.

In relation to the processes described herein contacting is to be understood to include immersion or partial immersion of the substrate in the relevant zeolite synthesis mixture.

The hydrothermal treatment to form the molecular sieve film is advantageously carried out by contacting the support carrying the monolayer in a synthesis mixture, and heating for a time and at the temperature necessary to effect crystallisation, advantageously in an autoclave under autogenous pressure. Heating times may be, for example, in the range of from 1 hour to 14 days, advantageously from 1 hour to 6 days. If microwave heating is used the time may be reduced to a matter of minutes. Temperatures are below 200° C. advantageously below 150° C. and within the range of 80 to 150° C., preferably within the range 80 to 125° C. and most preferably less than 100° C.

If desired, the formation of zeolite crystals within the synthesis mixture itself may be inhibited by maintaining the pH of the synthesis mixture in the range of from 6 to 13. In such low-alkaline synthesis mixtures the effectiveness of the molecular sieve crystals in the monolayer in acting as seed crystals is enhanced, thereby facilitating the growth of the molecular sieve film. On the other hand, if so desired, the formation of molecular sieve crystals within the synthesis mixture itself may be controlled by adding very small quantities of colloidal size seed crystals to the synthesis mixture, thereby reducing the growth of the molecular sieve film. It is believed that the addition of controlled amounts of colloidal molecular sieves to the synthesis mixture enables the thickness of the molecular sieve film to be controlled without changing the pH of the synthesis mixture, the crystallisation time or the crystallisation temperature.

Apart from the formation of a molecular sieve film on the substrate surface, crystals of the same molecular sieve type are formed in the solution phase. The conditions used in this step of the procedure can in normal cases be detrimental to the substrate surface, for example etching and dissolving, in the case of certain substrate/molecular sieve combinations when highly alkaline solutions are used. The adsorbed layers of cationic polymer and molecular sieve microcrystals provide some protection against such attack.

For certain types of molecular sieves, a final calcination step is necessary to burn off the organic molecules in the pore structure, thus providing an internal pore structure available for adsorption, catalysis or ion exchange. Calcination of films prepared according to the present inventions, and most often comprised of a treatment in air at a temperature exceeding 400° C., does not lead to cracks that can be observed with a scanning electron microscope.

If the support is porous then, advantageously, before the molecular sieve microcrystals are applied from an aqueous reaction mixture or the monolayer structure is contacted with the synthesis solution, the support is treated with a barrier layer.

The barrier layer functions to prevent the coating mixture or components thereof from preferentially entering the pores of the support e.g. to such an extent that the zeolite crystals form a thick gel layer on the support.

The barrier layer may be temporary or permanent. As a temporary layer, there may be mentioned an impregnating fluid that is capable of being retained in the pores during application of the reaction mixture, and readily removed after such application and any subsequent treatment.

To improve penetration, the fluid barrier may be applied at reduced pressure or elevated temperature. Premature evaporation of fluid from the outermost pores during treatment may be reduced by providing an atmosphere saturated with the liquid vapour.

As a temporary barrier layer suitable, for example, for an alpha-alumina support there may be especially mentioned water or glycol. As a permanent barrier suitable for an alpha-alumina support there may be mentioned titania, gamma-alumina or an alpha-alumina coating of smaller pore size.

Larger supports, for example, honeycomb reactor sections, may be treated by sealing the support in its reactor housing, either before or after applying the monolayer, and the synthesis mixture then poured into the housing, or pumped through it, crystallisation, washing and calcining taking place with the support already in its housing.

If desired or required, areas of the support whether porous or non-porous upon which it is not wanted or needed to form the monolayer and/or the molecular sieve film may be masked before application, using, e.g., wax, or unwanted zeolite on such areas may be removed after application.

The molecular sieve film structure of the present invention despite being relatively thin (less than 2 μm) is found to be continuous and dense and to consist of intergrown molecular sieve crystals. In addition in contrast with some prior art methods although a nucleation seeding layer is utilised in its preparation this is no longer visible in the final product as a distinct layer because the monolayer microcrystals are incorporated into the molecular sieve film. The resultant product has the attributes of prior art molecular sieve films prepared using multi-layer nucleation layers without the problems associated with such layers which are for example reduced flux of the final membrane and being prone to crack formation.

It will be appreciated that the structure may be of any shape, and may be, for example, planar, cylindrical, especially cylindrical with a circular cross-section, or may be a honeycomb structure. For clarity, however, the following description will refer to the structure as if it were planar, and references will be made to the plane of a layer.

This molecular sieve film in this structure is also found to exhibit a certain degree of CPO (as defined below) and SPO (as defined below). The film despite being relatively thin is found to be columnar in nature.

What is meant by columnar in this context is that the molecular sieve film comprises a crystalline molecular sieve in which at least 75%, as viewed by scanning electron microscopy (SEM), and advantageously at least 85%, of the crystallites at the uppermost face extend to the interface between the film and the substrate.

Advantageously, at least 75%, as viewed by scanning electron microscopy (SEM), of the grain boundaries in the upper layer are, at least in the region of the uppermost face, within 30° of the perpendicular to the layer plane, more advantageously at least 90% being within that angle, and preferably at least 90% are within 25° and most preferably 15° of perpendicular.

The directions of grain boundaries of the crystals in the upper layer indicate the extent to which the crystals have a shape preferred orientation (SPO).

Materials comprising non-spherical grains may exhibit a dimensional preferred orientation or shape preferred orientation (SPO). An SPO may be defined, for example, as a non-random orientation distribution of the longest dimensions of the grains or crystals. Such an SPO may be detected, for instance, on cross-sectional electron micrographs; only the outline of the grains or crystals is considered, the orientation of the longest dimension of each is determined and this is used to determine the orientation distribution.

Because the shape of a grain or crystal is not necessarily related to its crystallographic orientation, SPO is in principle independent from CPO, although in many cases SPO and CPO are related.

The products of the invention may be characterised by X-Ray Diffraction (XRD) among other techniques. For this purpose a conventional powder. diffraction technique may be used, where the supported layered structure in the shape of a disk is mounted in a modified powder sample holder and a conventional θ/2θ scan is performed. The intensities of the zeolite reflections thus measured are compared to the intensities of reflections of a randomly oriented powder of a zeolite of the same structure and composition. If one or more sets of reflections, related to one or more specific orientations of the crystal, are significantly stronger than the remaining reflections as compared to the diffractogram of a randomly oriented powder, this Indicates that the orientation distribution In the sample deviates from random. This is referred to as a crystallographic preferred orientation or CPO. An example of a simple CPO is the case where the 00l reflections (e.g., 002, 004, 006, etc. for MFI) are strong while all other reflections are weak or absent. In this case the majority of the crystals has the crystallographic c-axis close to the normal to the plane of the layer; it is often referred to as a c-axis CPO. Another example is a diffractogram where the h00 reflections (200, 400, 600, 800 etc. for MFI) are dominant; this is referred to as an a-axis CPO. More complex situations may also occur, for example a diffractogram where both the 0k0 and 00l reflections dominate, which is referred to as a mixed b- and c-axis CPO.

In the case of a CPO, a unique identification of the crystal structure type based on the XRD diffractogram of the layer alone may not be possible, because only a limited number of reflections may be detected. In principle, the material of the layer should be separated from the substrate, ground to a powder and a randomly oriented powder diffractogram should be obtained to verify the structure type. In practice this is often difficult. Therefore, if the synthesis has yielded any powder product or deposits on the walls or bottom of the autoclave, this material is used for the identification of the structure type. If all the reflections in the diffractogram of the layer can be attributed to specific sets of reflections in the indexed powder diffractogram (e.g., the 00l reflections), it is good indication that the layer has the same structure type as the powder.

The quantification of the degree of CPO may be based on the comparison between the observed XRD diffractogram with that of a randomly oriented powder. For each type of crystal structure and CPO a specific set of reflections may be selected to define a number that can be used as a parameter to describe the degree of CPO. For example, in the case of a structure in which the uppermost layer has the MFI zeolite structure type, and the crystals have a c-axis CPO, a CPO-parameter $C_{ool}$ may be defined using the intensities, I, of the 002-reflexion and the combined 200 and 020 reflections, as follows:

$$C_{ool} = \frac{(I_{002}/I_{200,020})_S - (I_{002}/I_{200,020})_R}{(I_{002}/I_{200,020})_S} \cdot 100$$

where $I_{200,020}$ and $I_{002}$ are the background-corrected heights of the combined MFI-200,020 reflections and of the MFI-002 reflection, respectively, for a randomly oriented powder R and for the sample S under investigation, before calcination.

A value for the parameter $C_{ool}$ of 0 represents random orientation, while 100 represents the virtual absence of 100 and 010 planes parallel to the layer plane. The absence of all MFI reflexions except the 00l reflections indicates a nearly perfect alignment of 00l planes parallel to the layer.

Similarly, in the case of an a-axis CPO, a parameter $C_{h00}$ may be defined using the intensity of the 10 0 0 reflection relative to the intensity of, for instance, the sum of the 002 and 0 10 0 reflections, or the 133 reflection (before calcination) as in the following definition:

$$C_{h00} = \frac{(I_{1000}/I_{133})_S - (I_{1000}/I_{133})_R}{(I_{1000}/I_{133})_S} \cdot 100$$

For other types of CPO other parameters may be defined. Other ways to measure CPO may also be used, for example, texture goniometry.

Advantageously, for a c-axis CPO, a structure according to the invention has a parameter $C_{ool}$ of at least 50, and preferably at least 95. Advantageously, however, the molecular sieve film exhibits strong CPO and SPO.

Advantageously, In the molecular sieve film, the crystals are contiguous, i.e., substantially every crystal is in contact with its neighbours, although not necessarily in contact with its neighbours throughout its length. (A crystal is in contact with its neighbour if the space between them is less than 2 nm wide.) Preferably, the molecular sieve film is substantially free from defects greater than 4 nm in cross-section, extending through its thickness.

The process of the present invention allows the preparation of thin films (leos than 2 $\mu$m) of molecular sieve on a substrate with acceptable performance and properties without the visible presence of an intermediate seeding layer. However the process is equally applicable to the preparation of thicker films of molecular sieve on a substrate e.g films of up to 150 $\mu$m may be prepared using this technique. It is expected that such films will also have superior properties and performance. Advantageously, the thickness of the molecular sieve film layer and the crystallite size of the molecular sieve are such that the layer thicknesses approximately the size of the longest edges of the crystals, giving essentially a monolayer with a columnar structure.

The invention also provides a structure in which the support, especially a porous support, has molecular sieve films according to the invention on each side, the layers on the two sides being the same or different; it is also within the scope of the invention to provide a film not in accordance with the invention on one side of the support, or to incorporate other materials in the support if it is porous.

The molecular sieve film may, and for many uses advantageously do, consist essentially of the molecular sieve material, or may be a composite of the molecular sieve material and intercalating material which may be organic or inorganic. The intercalating material may be the same material as the support. The material may be applied simultaneously with or after deposition of the molecular sieve, and may be applied, for example, by a sol-gel process followed by thermal curing. Suitable materials include, for example, inorganic oxides , e.g., silica, alumina, and titania. The intercalating material is advantageously present in sufficiently low a proportion of the total material of the film that the molecular sieve crystals remain contiguous.

Although it is expected that in many cases the molecular sieve film will be crack and defect free it is possible that during preparation of the film or during post-treatment or handling or use of the film cracks or defects may be formed. The remainder of the film under these circumstances may be intact and of high quality and performance although the film as a whole will be deficient due to these local defects. In these cases it will be necessary to separate the film. Such reparation techniques for inorganic membranes are known in the art.

A catalytic function may be imparted to the molecular sieve film structure of the present invention either by bonding of a catalyst to the support or the free surface of the molecular sieve film, or its location within a tube or honeycomb formed of the structure, by its incorporation in the support, e.g., by forming the support from a mixture of support-forming and catalytic site-forming materials or in the monolayer or molecular sieve film itself. If the support is porous a catalyst may be incorporated into the pores, the catalyst optionally being a zeolite. For certain applications, it suffices for the structure of the invention to be in close proximity to, or in contact with, a catalyst, e.g. in particulate form on a face of the structure.

Catalytically active sites may be incorporated in the molecular sieve film of the structure, e.g., by selecting as zeolite one with a finite $SiO_2$:$Al_2O_3$ ratio, preferably lower than 300. The strength of these sites may also be tailored by ion-exchange. Metal or metal oxide precursors may be included in the synthesis mixture for the monolayer microcrystals or molecular sieve film, or both, or metal, metal oxides, salts or organic complexes may be incorporated by impregnation of or ion-exchange with the pre-formed molecular sieve film. The structure may also be steamed, or treated in other manners known per se, to adjust properties.

The layers may be configured as a membrane, a term used herein to describe a barrier having separation properties, for separation of fluid Igaseous, liquid, or mixed) mixtures, for example, separation of a feed for a reaction from a feedstock mixture, or in catalytic applications, which may if desired combine catalysed conversion of a reactant or reactants and separation of reaction products.

Separations which may be carried out using a membrane comprising a structure in accordance with the invention include, for example, separation of normal alkanes from co-boiling hydrocarbons, for example, normal alkanes from isoalkanes in $C_4$ to $C_6$ mixtures and n-$C_{10}$ to $C_{16}$ alkanes from kerosene; separation of normal alkanes and alkenes from the corresponding branched alkane and alkene isomers; separation of aromatic compounds from one another, especially separation of $C_8$ aromatic isomers from each other, more especially para-xylene from a mixture of xylenes and, optionally, ethylbenzene (e.g. separation of p-xylene from a p-xylene-rich mixture produced in a xylene isomerization process), and separation of aromatics of different carbon numbers, for example, mixtures of benzene, toluene, and mixed $C_8$ aromatics; separation of aromatic compounds from aliphatic compounds, especially aromatic molecules with from 6 to 8 carbon atoms from $C_5$ to $C_{10}$ (naphtha range) aliphatics; separation of aromatic compounds from aliphatic compounds and hydrogen in a reforming reactor; separation of olefinic compounds from saturated compounds, especially light alkenes from alkanelalkene mixtures, more especially ethene from ethane and propene from propane; removing hydrogen from hydrogen-containing streams, especially from light refinery and petrochemical gas streams, more especially from $C_2$ and lighter components; removing hydrogen from the products of refinery and chemical processes such as the dehydrogenation of alkanes to give alkenes, the dehydrocyclization of light alkanes or alkenes to give aromatic compounds and the dehydrogenation of ethylbenzene to give styrene; removing alcohols from aqueous streams; and removing alcohols from hydrocarbons, especially alkanes and alkenes, that may be present in mixtures formed during the manufacture of the alcohols.

Conversions which may be effected include isomerizations, e.g., of alkanes and alkenes, conversion of methanol or naphtha to alkenes, hydrogenation, dehydrogenation, e.g., of alkanes, for example propane to propylene, oxidation, catalytic reforming or cracking and thermal cracking.

Feedstocks derived from hydrocarbons, e.g., in the form of petroleum or natural gas or feedstocks derived from coal, bitumen or kerogen, or from air, the feedstocks containing at least two different molecular species, may be subjected to separation, e.g., by molecular diffusion, by contact with a structure according to the invention, advantageously one configured as a membrane, at least one species of the feedstock being separated from at least one other species.

The following table gives examples of such separations.

| Feedstock | Separated Molecular Species |
|---|---|
| Mixed xylenes (ortho, para, meta) and ethylbenzene | Paraxylene |
| Mixture of hydrogen, $H_2S$, and ammonia | Hydrogen |
| Mixture of normal and isobutanes | Normal butane |
| Mixture of normal and isobutenes | Normal butene |
| Kerosene containing $C_9$ to $C_{18}$ normal paraffins | $C_9$ to $C_{18}$ normal paraffins |
| Mixture of nitrogen and oxygen | Nitrogen (or oxygen) |
| Mixture of hydrogen and methane | Hydrogen |
| Mixture of hydrogen, propane, and propylene | Hydrogen and/or propylene |
| Mixture of hydrogen, ethane, and ethylene | Hydrogen and/or ethylene |
| Coker naphtha containing $C_5$ to $C_{10}$ normal olefins and paraffins | $C_5$ to $C_{10}$ normal olefins and paraffins |
| Methane and ethane mixtures containing argon, helium, neon, or nitrogen | Helium, neon, and/or argon |
| Intermediate reactor catalytic reformer products containing hydrogen and/or light gases | Hydrogen, and/or light gases ($C_1$–$C_7$) |
| Fluid Catalytic Cracking products containing $H_2$ and/or light gases | Hydrogen, and/or light gases |
| Naphtha containing $C_5$ to $C_{10}$ normal paraffins | $C_5$ to $C_{10}$ normal paraffins |
| Light coker gas oil containing $C_9$ to $C_{18}$ normal olefins and paraffins | $C_9$ to $C_{18}$ normal olefins and paraffins |
| Mixture of normal and isopentanes | Normal pentane |
| Mixture of normal and isopentenes | Normal pentene |
| Mixture of ammonia, hydrogen, and nitrogen | Hydrogen and nitrogen |
| Mixture of A10 (10 carbon) aromatics | e.g. Paradiethylbenzene (PDEB) |
| Mixed butenes | n-butene |
| Sulfur and/or nitrogen compounds | $H_2S$ and or $NH_3$ |
| Mixtures containing benzene (Toluene mixtures) | Benzene |

Examples of chemical reactions which may be effected by the structure of the invention, advantageously one configured as a membrane, in association with a catalyst, (e.g. the catalyst is a module with the structure) or treated to impart catalytic activity to the structure, are given in the following table:

| Feedstock/process | Product Yielded |
|---|---|
| Mixed xylenes (para, ortho, meta) and ethylbenzene | Paraxylene and/or ethylbenzene |
| Ethane dehydrogenation to ethylene | Hydrogen and/or ethylene |
| Ethylbenzene dehydrogenation to styrene | Hydrogen |
| Butanes dehydrogenation butenes (iso's and normals) | Hydrogen |
| Propane dehydrogenation to propylene | Hydrogen and/or propylene |
| $C_{10}$–$C_{18}$ normal paraffin dehydrogenation to olefins | Hydrogen |
| Hydrogen Sulfide decomposition | Hydrogen |
| Reforming dehydrogenation/aromatization | Hydrogen, light hydrocarbons ($C_1$–$C_7$) |
| Light Petroleum Gas dehydrogenation/aromatization | Hydrogen |
| Mixed Butenes | n-Butene |

The structure of the invention may be employed as a membrane in such separations without the problem of being damaged by contact with the materials to be separated. Furthermore, many of these separations are carried out at elevated temperatures, as high as 500° C., and it is an advantage of the structure of the present invention that it may be used at such elevated temperatures.

The present invention accordingly also provides a process for the separation of a fluid mixture which comprises contacting the mixture with one face of a structure according to the invention in the form of a membrane under conditions such that at least one component of the mixture has a different steady state permeability through the structure from that of another component and recovering a component of mixture of components from the other face of the structure.

The present invention accordingly also provides a process for the separation of a fluid mixture which comprises contacting the mixture with a structure according to the invention in one embodiment in the form of a membrane under conditions such that at least one component of the mixture is removed from the mixture by adsorption. Optionally the adsorbed component is recovered and used in a chemical reaction or may be reacted as an adsorbed species on the structure according to the invention.

The invention further provides such processes for catalysing a chemical reaction in which the structure is in close proximity or in contact with a catalyst.

The invention further provides a process for catalysing a chemical reaction which comprises contacting a feedstock with a structure according to the invention which is in active catalytic form under catalytic conversion conditions and recovering a composition comprising at least one conversion product.

The invention further provides a process for catalysing a chemical reaction which comprises contacting a feedstock with one face of a structure according to the invention, that is in the form of a membrane and in active catalytic form, under catalytic conversion conditions, and recovering from an opposite face of the structure at least one conversion product, advantageously in a concentration differing from its equilibrium concentration in the reaction mixture.

The invention further provides a process for catalysing a chemical reaction which comprises contacting a feedstock with one face of a structure according to the invention that is in the form of a membrane under conditions such that, at least one component of said feedstock is removed from the feedstock through the structure to contact a catalyst on the opposite side of the structure under catalytic conversion conditions.

The invention further provides a process for catalysing a chemical reaction which comprises contacting one reactant of a bimolecular reaction with one face of a structure according to the invention, that is in the form of a membrane and in active catalytic form, under catalytic conversion conditions, and controlling the addition of a second reactant by diffusion from the opposite face of the structure in order to more precisely control reaction conditions. Examples include: controlling ethylene, propylene or hydrogen addition to benzene in the formation of ethylbenzene, cumene or cyclohexane respectively.

DESCRIPTION OF THE ILLUSTRATIONS

FIG. 1 shows a micrograph of a monolayer of silicalite-1 bound to the surface of a monocrystal Si substrate by means of electrostatic adsorption, obtained with a scanning electron microscope.

FIG. 2 shows a micrograph of a film of TPA-silicalite-1 on a monocrystal Si substrate, obtained with a scanning electron microscope.

FIG. 3 shows a micrograph, obtained with a scanning electron microscope, of of hollow fibers of silicalite-1 (left hand side image) and zeolite Y right hand side image), prepared by building up a molecular sieve films on the surface of the carbon fibers, followed by removal of the carbon fiber through calcination.

CHARACTERIZATION

The procedure according to the present invention was evaluated by examining the materials by means of scanning electron microscopy (SEM), powder X-ray diffraction (XRD), spectroscopy, as well as specific surface area measurements using $N_2$ and Kr adsorption.

The scanning electron microscopy studies were performed using samples coated with carbon or gold (by means of respectively vapour deposition and sputtering techniques). A scanning electron microscope of the Philips XL 30 type fitted with a $LaB_6$ emission source was used in these studies.

X-ray diffraction studies were performed on untreated film samples, using a Philips PW 1710-00 powder diffractometer.

Kr-adsorption measurements to determine the specific surface area were performed by means of an ASAP 2010 apparatus from Micromeritics Instruments Inc. Prior to these measurements, the films were degassed at 250°C. for 3 hours.

Spectroscopic studies of certain samples prepared according to the present invention were performed with a Perkin Elmer 2000 FT i.r. spectrometer (infrared spectroscopy), as well as a Perking Elmer Lambda 2S UV-VIS spectrometer (spectroscopy within the visible and ultraviolet wavelength regions).

Particle size and particle size distribution analyses of the colloidal suspensions of molecular sieves used in preparing the thin molecular sieve films described in the present invention were made using dynamic light scattering (ZetaPlus, Brookhaven Instruments).

The invention will be described below by means of several examples. However, the latter should not be considered as limiting the invention.

EXAMPLE 1

The example illustrates the preparation of a silicalite-1 film with a thickness of about 100 nm on a crystalline silicon substrate.

A colloidal suspension of discrete silicalite-1 particles was prepared by hydrothermal synthesis at 55° C. of a synthesis solution with the following composition : 9 TPAOH: 25 $SiO_2$: 480 $H_2O$: 100 EtOH, TPAOH representing tetrapropyl ammonium hydroxide and EtOH representing ethanol. The silicic acid was added as tetraethoxy silane, hydrolyzed in an aqueous TPAOH solution. After synthesis, the resulting sol was purified by separation from the mother liquor by centrifugation, after which the sol particles were re-dispersed in distilled water. The pH was adjusted to 10.5 by adding 0.10 M ammonia. The size of the resulting colloidal particles was found to be 51 nm by dynamic light scattering.

A crystalline silicon substrate in the form of a wafer (40×9×0.4 mm) was mounted vertically in a teflon holder and cleaned with acetone in an ultrasonic bath for five minutes. The silicon substrate was then boiled in a solution with the following composition (on a volume basis) : (5 $H_2O$: 1 $H_2O_2$ (30 wt-%): 1 $NH_3$ (25 wt-%) for five minutes and subsequently in a solution with the following composition (on a volume basis) : (6 $H_2O$: 1 $H_2O_2$ (30 wt-%): 1 HCl (37 wt-%)) for five minutes. Between each cleaning step, the substrate was rinsed with distilled water. After the cleaning procedure, the substrate was treated for one hour with a solution adjusted to pH 8.0 and containing 0.4 wt.-% cationic polymer (Berocell 6100, Akzo Nobel AB, Sweden), in order to reverse the surface charge of the substrate from an initially negative to a positive value. Excess cationic polymer was rinsed off with 0.1 M ammonia. The surface modified substrate was transferred to the above described sol (with a solids content of 2.5 wt-%), containing colloidal silicalite-1 crystals with a size of 51 nm and these crystals were allowed to adsorb onto the substrate surface for one hour. The colloidal crystals in excess, if any. were rinsed off with an 0.1 M ammonia solution. Through this treatment, a monolayer of silicalite crystals was built up on the substrate surface. FIG. 1 shows an electron micrograph of the adsorbed silicalite crystals on the substrate surface.

The substrate with the adsorbed silicalite-1 crystal monolayer was then first processed at 550° C. in a 100% steam atmosphere for one hour. After cooling, the substrate was further treated with a synthesis solution of the following composition : 3 TPAOH : 25 $SiO_2$: 1500 $H_2O$: 100 EtOH, at 100° C. for 13 hours. This treatment resulted in a continued growth and intermeshing of the adsorbed crystals and the formation of a dense and continuous silicalite film on the substrate surface. FIG. 2 shows an SEM micrograph (lateral view) of this film. From this SEM micrograph, the film thickness was estimated to be 100 nm.

A sample of the product was analyzed by X-ray diffractometry and by FTIR spectroscopy. By both these analysis techniques, the film was identified as consisting of silicalite1. A sample of the product was calcined at 600° C. in air in a preheated muffle furnace, to remove organic material ($TPA^+$) and to make the silicalite pore structure available for gas adsorption. The specific surface area of the sample was then determined by means of Kr-adsorption and found to be 72 $m^2/(m^2$ substrate surface), a value corresponding well with what is to be expected for a 100 nm silicalite film on this type of silicon substrate.

EXAMPLE 2

This example illustrates the preparation of films with a thickness of about 100 nm on alumina and quartz substrates.

Monocrystalline structures in the form of sapphire (α-aluminium oxide) and of quartz disks (10×10×1 mm) were vertically mounted in teflon holders and cleaned with acetone in an ultrasonic bath for five minutes. The substrates were then boiled in a solution with the following composition (on a volume basis): (5 $H_2O$: 1 $H_2O_2$ (30 wt-%): 1 $NH_3$ (25 wt-%) for five minutes and subsequently in a solution with the following composition (on a volume basis): (6 $H_2O$: 1 $H_2O_2$ (30 wt-%): 1 HCl (37 wt-%)) for five minutes. Between each cleaning step, the substrates were rinsed with distilled water. After the cleaning procedure, the substrates were treated for one hour with a solution adjusted to pH 8.0 and containing 0.4 wt.-% cationic polymer (Berocell 6100, Akzo Nobel AB, Sweden), in order to reverse the surface charge of the substrate from an initially negative to a positive value. Excess cationic polymer was rinsed off with 0.1 M ammonia. The surface modified substrates were transferred to the above described sol (with a solids content of 2.5 wt-%), containing colloidal silicalite-1 crystals (see example 1) with a size of 51 nm and these crystals were allowed to adsorb onto the substrate surface for one hour. The colloidal crystals in excess, if any, were rinsed off with an 0.1 M ammonia solution. Through this treatment, a monolayer of silicalite crystals was built up on the substrate surfaces.

The substrates with the adsorbed silicalite-1 crystal monolayer were then first processed at 550° C. in a 100% steam atmosphere for one hour. After cooling, the substrate was further treated with a synthesis solution of the following composition : 3 TPAOH : 25 $SiO_2$: 1500 $H_2O$: 100 EtOH, at 100° C. for 13 hours. This treatment resulted in a continued growth and intermeshing of the adsorbed crystals and the formation of a dense and continuous silicalite film on the substrate surfaces, as confirmed by analysis through of scanning electron microscopy, x-ray diffractometry and specific surface area measurements by Kr-adsorption (after calcining at 600° C. in air). All these analyses yielded results analogous to those obtained when using crystalline silicon as the substrate (see implementation example 1) and show that the method is insensitive to the chemical properties of the substrate.

EXAMPLE 3

This example illustrates the preparation of a silicalite-1 film on a carbon fiber substrate.

A colloidal suspension of discrete silicalite-1 particles was prepared by hydrothermal treatment (100° C.) of a synthesis solution with the following molar composition: 9 TPAOH : 25 $SiO_2$: 480 $H_2O$: 100 EtOH, TPAOH representing tetrapropyl ammonium hydroxide and EtOH ethanol. The silicic acid was added as tetraethoxy silane, hydrolyzed in water. After synthesis, the resulting sol was purified by separation from the mother liquor by centrifugation, followed by re-dispersing the sol particles in distilled water. The pH of the purified sol was adjusted to 9.5 by adding 0.10 M ammonia. The size of the silicalite-1 crystals in the resulting sol was found to be 98 nm by dynamic light scattering.

Continuous carbon fibers, with a diameter of 7–15 micrometers were first cleaned with acetone in an ultrasonic bath and then with a solution having the following composition (on a volume basis): (5 $H_2O$: 1 $H_2O_2$ (30 wt-%): 1 HCl (37 wt-%)). After both these cleaning steps, the fibers were separated by vacuum filtration and rinsed with distilled water on the filter paper. After completing the cleaning procedure, the fibers were treated for one hour with a solution containing 1.0 wt-% cationic polymer (Berocell 6100, Akzo Nobel AB, Sweden), adjusted to pH 8.0, for inverting the substrate surface charge from an initially negative to a positive value. The charge reversed fibers were transferred to a colloidal sol (solids content: 4.6 wt-%), containing 98 nm silicalite-1 crystals, that were adsorbed as a monolayer onto the fiber surface. After one hour's contact between fibers and sol, the fibers were separated by filtration and washed with an 0.1 M ammonia solution. The fibers were then transferred to a synthesis solution with the following molar composition : 9 TPAOH : 25 $SiO_2$: 480 $H_2O$: 100 EtOH and hydrothermally treated with this solution for 24 hours at 100° C. Scanning electron microscopy examinations of the fibers showed this treatment to provide a dense and continuous silicalite film on the carbon fiber surface. In order to further characterize the film, a sample of the product was calcined at 600° C. in air for three hours. This treatment removed both the organic material in the silicalite pore structure and part of the carbon fiber around which the film was formed. As a consequence, there remained after this treatment a fibrous product consisting of the thin silicalite film built up on the fiber surface. FIG. 3 shows a scanning electron micrograph of the resulting material. From the micrograph it can be clearly seen that the film is indeed continuous and dense. This film was further characterized by means of x-ray diffractometry, FTIR spectroscopy and specific surface area measurement using nitrogen adsorption. These analyses showed the film to consist solely of silicalite-1.

EXAMPLE 4

This example illustrates the preparation of a zeolite Y film on a carbon fiber substrate.

A colloidal suspension of zeolite Y was prepared by hydrothermal treatment of a synthesis mixture with the following molar composition : 2.46 $(TMA)_2O$: 0.04 $Na_2O$: 1.0 $Al_2O_3$: 3.4 $SiO_2$: 370 $H_2O$, TMA representing the tetramethyl ammonium ion, which was added as tetramethyl ammonium hydroxide pentahydrate. The silicic acid was added as sodium stabilized silica sol, and the aluminate as an alkali stabilized aluminate solution. The alkali stabilized aluminate solution was prepared as follows: $Al_2(SO_4)_3.18 H_2O$ was dissolved in distilled water under mild heating. After complete dissolution, an ammonia solution containing 25 wt-% ammonia in water was added under vigorous stirring, in order to precipitate $Al(OH)_3$. The resulting gel was separated by vacuum filtration and the filter cake was dispersed in distilled water to dissolve the remaining sulfate. The gel was then again separated by filtration. This procedure was repeated until no sulfate ions could be detected in the filtrate by adding $BaCl_2$. The sulfate-free aluminum hydroxide was dissolved in an a aqueous TMAOH solution. The thus obtained alkali stabilized aluminate solution was added to the silica sol under vigorous stirring and treated at 100° C. until zeolite Y crystals with a size of 100 nm (as determined by dynamic light scattering) were formed. After completion of the synthesis the sol was purified by separation from the mother liquor through centrifugation, followed by re-dispersion in distilled water. The pH was adjusted to 9.5. by adding 0.1 M ammonia.

Charge reversed carbon fibers, prepared in the manner described in example 3, were transferred to the colloidal sol (solids content: 2.4 wt-%) containing 100 nm zeolite Y crystals, that were adsorbed as a monolayer onto the fiber surface. The fibers were in contact with the sol for one hour. After the sol treatment, the fibers were separated by filtration and the excess sol was rinsed off with a 0.1 M ammonia solution. The fibers were transferred to a synthesis solution with the following composition: 2.46 $(TMA)_2O$: 0.04 $Na_2O$: 1.0 $Al_2O_3$: 3.4 $SiO_2$: 370 $H_2O$, prepared as described above. The fibers were hydrothermally treated with this solution for 96 hours at 100° C. Analysis of the product by means of scanning electron microscopy revealed that this provided a dense and continuous zeolite Y film on the surface of the carbon fibers, see FIG. 3. The crystal structure of the film material was confirmed by further characterization using x-ray diffractometry and Kr-adsorption.

EXAMPLE 5

This example illustrates the application of a zeolite A film to a carbon fiber substrate.

A colloidal suspension of zeolite A was prepared by hydrothermally treating a synthesis mixture with the following molar composition: 1.2 $(TMA)_2O$: 0.4 $Na_2O$: 1.0 $Al_2O_3$: 3.4 $SiO_2$: 246 $H_2O$, TMA representing the tetramethyl ammonium cation. The synthesis solution was prepared by the procedure described example 4. After completing the synthesis, the resulting sol was purified according to the procedure described in example 1 and the pH of the purified sol was adjusted to 9.5. by adding 0.1 M ammonia. Charge reversed carbon fibers, prepared in the manner described in example 3, were transferred to the colloidal sot containing 120 nm zeolite A crystals (solids content: 2.8 wt-%). This resulted in the adsorption of a monolayer of zeolite A crystals onto the carbon fiber surface. After this treatment, the fibers were separated by filtration and rinsed with 0. 1 M ammonia to remove excess sol. The fibers were transferred to a synthesis solution with the following composition: 1.2 $(TMA)_2O$: 0.4 $Na_2O$: 1.0 $Al_2O_3$: 3.6 $SiO_2$: 246 $H_2O$, prepared according to the procedure described in example 4. The fibers were treated with this solution for 60 hrs at 100° C. This treatment resulted in the formation of a dense and continuous zeolite A film on the carbon fiber surface, as shown by scanning electron microscopy and x-ray diffractometry analysis.

EXAMPLE 6

This example illustrates the application of a Ti-silicalite-1 film to a carbon fiber substrate.

A colloidal suspension of Ti-silicalite-1 was prepared by hydrothermal treatment of a synthesis solution with the following composition: 9 TPAOH: 1.46 $TiO_2$: 25 $SiO_2$: 404 $H_2O$: 100 EtOH, TPAOH being the tetrapropyl ammonium cation added as a solution of tetrapropyl ammonium hydroxide in water. $TiO_2$ was added as tetraethyl orthotitanate (34.1 wt-% $TiO_2$).

The synthesis solution was prepared as follows. Tetraethyl orthotitanate was added to tetraethoxy silane under stirring. A solution of TPAOH was added dropwise to this solution under vigorous stirring. The resulting synthesis solution was hydrothermally treated at 100° C. for 20 hours. This resulted in the crystallization of a colloidal suspension of discrete Ti-silicalite-1 crystals. After completing the synthesis, the colloidal particles were separated from the mother liquor by centrifugation, after which the particles were re-dispersed in distilled water and the pH adjusted to 9.5. by adding 0.1 M ammonia. The average particle size of the colloidal Ti-silicate crystals was found to be 90 nm by dynamic light scattering.

Charge reversed carbon fibers, prepared in the manner described in example 3, were immersed in the colloidal sol (solids content: 1.9 wt-%) of Ti-silicalite-1 microcrystals, that were allowed to adsorb onto the fiber surface. The duration of the contact between sol and fibers was one hour. After completing the treatment, the fibers were washed according to the procedure of example 3.

The fibers were then transferred to a synthesis solution with the following composition: 9 TPAOH: 1.46 $TiO_2$: 25 $SiO_2$: 404 $H_2O$: 100 EtOH. The synthesis solution was prepared according to the procedure described above. The fibers were hydrothermally treated with this solution at 100° C. for 24 hours. Scanning electron microscopy analysis of this product showed that this treatment provided a dense and continuous Ti-silicalite-1 film on the carbon fiber surface. Further analysis of the composite material prepared was performed by means of x-ray diffractometry, DRIFT (diffuse reflectance infrared spectroscopy) and UV-VIS spectroscopy. These analyses confirmed that the film obtained consisted of Ti-silicalite-1.

EXAMPLE 7

This example demonstrates the use of repeated hydrothermal treatments in adequate synthesis solutions to increase the thickness of the final film to a desired value.

A substrate of crystalline silicon in the form of a plate (40×9×0.4 mml was washed in the manner described in example 1. After the washing procedure, the substrate was treated for five minutes with a solution, adjusted to pH 8.0 and containing 0.4 wt % cationic polymer (Berocell 6100, Akzo Nobel, Sweden) and subsequently washed with a 0.10 M ammonia solution. The surface modified substrate was transferred to a sol, (with a solids content of 2.5 wt %) containing silicalite-1 microcrystals with a size of ca. 30 nm, and contacted with this sol for five minutes in order to absorb a monolayer of microcrystals on the substrate surface. After rinsing with 0.10 M ammonia and drying in air, the substrate with absorbed microcrystals was calcined at 250° C. in air for 10 minutes and then allowed to cool to room temperature.

The sample was immersed into a synthesis solution with the composition: 3TPAOH: 25 $SiO_2$: 1500 $H_2O$: 100 EtOH and treated with this solution at 100° C. for 62 hours. This treatment resulted in a continued growth and intergrowth of the adsorbed crystals and in the formation of a dense and continuous film of silicilate on the surface of the substrate. The film thickness after this treatment was determined to 530 nm by SEM. This sample was then hydrothermally treated in the same manner (for 80 h) with a freshly prepared synthesis solution having the same composition as that described above. After this second hydrothermal treatment the film thickness was determined to ca. 1200 nm by SEM.

EXAMPLE 8

This example demonstrates the preparation of a dense and continuous film of silicalite-1 on the surface of a porous γ/α-aluminium oxide membrane.

A conventional γ/α-aluminiumoxide membrane with a nominal pore size of 5 nm was first treated with $O_2$-plasma and then washed according to the procedure described in example 1. After the washing procedure, the sample was rinsed with a 0.10 M ammonia solution filtered through a 0.1 micron PVDF-membrane. The aluminium oxide membrane was then treated for 10 minutes with a solution, adjusted to pH 8.0 and containing 0.4 wt % cationic polymer (Berocell 6100, Akzo Nobel, Sweden) and subsequently rinsed with a filtered 0.10 M ammonia solution. The surface modified membrane was transferred to a sol, (with a solids content of 2.5 wt %) containing silicalite-1 microcrystals with a size of ca. 30 nm, and contacted with this sol for 10 minutes in order to adsorb a monolayer of microcrystals on the membrane surface. After rinsing with filtered 0.10 M ammonia and drying in air, the membrane with adsorbed microcrystals was calcined by placing in it a cool furnace, heating the furnace to 425° C. over a period of 20 minutes and keeping this temperature for 10 minutes. The furnace was then switched off and allowed to cool to room temperature before the membrane was taken out. The membrane was then mounted in a teflon holder designed to protect the reverse side of the membrane from the synthesis solution. The mounted membrane was hydrothermally treated with a synthesis solution having the composition: 3TPAOH: 25 $SiO_2$: 1500 $H_2O$: 100 EtOH at 100° C. for 77 hours. Prior to use, the synthesis solution was filtered through a PVDF-membrane with a pore size of 0.1 micron. After the hydrothermal treatment, the membrane was taken out and rinsed with 0.10 M ammonia. The synthesis procedure was then repeated using the same conditions and the same (freshly prepared) synthesis solution as above. The membrane was finally rinsed with 0.10 M ammonia and dried in air. The non-calcined membrane was tested in a permeation experiment at 70° C. and with ΔP=1.0 bar. The measured flux was <1.7 $10^{-5}$ l/($m^2$h bar) showing that the film was essentially gas tight.

EXAMPLE 9

This example demonstrates the preparation of a thin film of hydroxysodalite on a quartz substrate.

A colloidal suspension of discrete crystals of hydroxysodalite was prepared by hydrothermal treatment of a solution with the molar composition: 14(TMA)$_2$O: 0.85Na$_2$O: 1.0Al$_2$O$_3$: 40SiO$_2$: 805H$_2$O. The sol was purified using the procedure described in example 1 and the final pH of the sol was adjusted to 10.5 by addition of 0.1 M NaOH. The size of the colloidal microcrystals of hydroxysodalite was determined to 26 nm by dynamic light scattering.

A monocrystalline substrate in the form of a plate (10× 10×1 mm) of quartz was vertically mounted in a teflon holder and washed according to the procedure described in example 1. After the washing procedure, the substrate was treated for 10 minutes with a solution, adjusted to pH 8.0 and containing 0.4 wt % cationic polymer (Berocell 6100, Akzo Nobel, Sweden) and subsequently washed with a 0.10 M ammonia solution. The surface modified substrate was transferred to a sol, (with a solids content of 2.5 wt %) containing the hydroxysodalite microcrystals, and contacted with this sol for 10 minutes. In order to improve the adsorption of microcrystals on the substrate surface, the treatment with the cationic polymer and the subsequent adsorption of microcrystals was repeated once. After rinsing with 0.10 M ammonia and drying in air, the substrate with adsorbed microcrystals was calcined at 425° C. in air for 30 minutes and then allowed to cool to room temperature. The sample was immersed into a synthesis solution with the composition: 14(TMA)$_2$O: 1.9Na$_2$O:1.0Al$_2$O$_3$: 40SiO$_2$: 815H$_2$O and treated with this solution at 100° C. for 16 hours. This treatment resulted in a continued growth and intergrowth of the adsorbed crystals and in the formation of a film of hydroxysodalite on the surface of the substrate.

EXAMPLE 10

This example illustrates the preparation of a thin continuous film of zeolite Beta on a tantalum substrate.

The substrates used for growing zeolite Beta films were Ta plates (Plansee, Austria, 99.9%) with dimensions 10×30 mm. Prior to use, the Ta surface was cleaned at room temperature for 15 min with acetone (p.a.) under ultrasonic action and then for 10 min with a solution having the molar composition 9H$_2$O$_2$: 10 HCl: 350H$_2$O. After these cleaning procedures, the Ta plates were rinsed several times with distilled water. The surface charge of the Ta plates was reversed by treatment with a cationic polymer (Berocell 6100, Akzo Nobel, Sweden) with the repeating unit (CH$_2$CHOHCH$_2$H(CH$_3$)$_2$)$_n$$^+$0 and an average molecular weight of 50,000 g/mol. The Ta plates were immersed for 1 h in 30 ml of a solution containing 0.5 wt % of the cationic polymer and then the excess polymer was rinsed with a 0.1 M ammonia solution.

A colloidal suspension of zeolite Beta (average crystal size, 90 nm) was prepared by hydrothermally treating a precursor solution with the molar composition 0.35Na$_2$O: 9TEAOH: 0.25Al$_2$O$_3$: 25SiO$_2$: 295H$_2$O for 6 days at 100° C. The crystals thus obtained were separated form the mother liquor by centrifugation and redispersed in distilled water whereafter the suspensions were centrifuged again. This procedure was repeated until the pH of the zeolite suspension was in the range 9.5–10.0. The surface modified Ta substrate was contacted with the purified zeolite Beta suspension (3.5 wt %, pH adjusted to 10 with a 0.1 M ammonia solution) for 1 h whereafter excess zeolite was rinsed off with a 0.1 M NH$_3$ solution. SEM analysis of the composite shows a monolayer of zeolite Beta crystals on the Ta substrate.

The Ta-substrate with adsorbed zeolite Beta crystals was calcined in air at 300° C. for 1 h whereafter the composite was immersed in a zeolite Beta precursor solution with the molar composition given above and hydrothermally treated under reflux for 6 days at 100° C. Scanning electron microscopy (SEM) micrographs of the zeolite film after hydrothermal treatment shows a polycrystalline morphology and side-view images show a continuous film with an average thickness of 200 nm. The Beta film was characterised by Reflection-Absorption Infrared Spectroscopy (RAIR) using a Perkin Elmer PE 2000 FT-IR spectrometer. The angle of incidence was 83° and 500 interterograms at 4 cm$^{-1}$ resolution was performed for each spectrum. The absorbance bands characteristic of BEA-type molecular structure at 450, 520, 570, 1150, 1175 and 1230 cm$^{-1}$ were seen in the spectrum of zeolite Beta film sample. XRD analysis of the substrate and film showed that the deposited material is zeolite Beta.

EXAMPLE 11

Colloidal suspensions of TPA-slilicilite-1 were synthesized using tetraethoxysilane (TEOS, >98% GC grade, <3 ppm Al, Aldrich-Chemie), tetrapropylammonium hydroxide (TPAOH, 1.0 M in water, 143 ppm Na, 4200 ppm K, <10 ppm Al, Sigma) and distilled water.

Preparation of thin silicalite-1 films

The surface of gold substrates (prepared by depositing gold on pretreated TiN-covered silicon (100) wafers using a BAL-TEC MED 020 Coating System operating at a base pressure of ca. 2 10$^{-2}$ mbar) was modified by contacting the substrate with a solution of 10 mM MPS (gamma-mercaptopropyltrimethoxysilane (MPS, Osi Specialities)) in methanol for 3 hours at room temperature. The surface-attached silane was hydrolyzed at room temperature in an acidic solution (0.10 M HCl) for 15 hours. The excess silane was removed by rinsing with ethanol.

A suspension of descrete colloidal crystals with an average size of 90 nm was prepared in a similar manner to earlier examples. The molar composition of the seed precursor sol was 9 TPAOH: 25 SiO$_2$: 480 H$_2$O: 100 ethanol. The pH of the purified sol was reduced to 3.4 by the addition of a strong cationic exchange resin (DOWEX HCR-S(H$^+$), Dow Chemical). A monolayer of silicaliate-1 was adsorbed by contacting the silane-covered substrate with 40 ml of a 4.2 wt % silicalite-1 suspension at a pH of 3.4 (silicalite-1 zeta (ζ)potential: +50 to +60 mV) for 1 hour. The plates were rinsed several times with distilled water to remove excess crystalline material. The wafers were calcined in air at 300 for 1 hour. The composite wafers were contacted with a TPA-silicalite-1 precursor solution with the molar composition 3 TPAOH: 25 SiO$_2$: 1500 H$_2$O: 100 ethanol and hydrothermally treated at 100° C. for 20 hours. After synthesis, the wafers were washed with distilled water and acetone and dried at 100° C. for 30 minutes. Thin films of silicalite-1 films were deposited on the gold substrate.

EXAMPLE 12

Thin silicalite-1 films on polished, gold-coated QCMs (Cold Springs R&D, Marcellus, New York; resonance frequency 10 Mhz; a 1-Hz shift corresponds to 4.3 ng/cm$^2$ per face) were prepared in a threestep process. The QCMs were first cleaned for 30 min. in an ultrasonic bath containing acetone, then rinsed several times with distilled water and sonicated twice for 10 min in distilled water. A monolayer of γ-mercaptopropyl-trimethoxysilane (MPS) was formed on the QCM by contacting the substrate with a solution of 10 nM MPS in methanol for 3 hours; this layer was subsequently hydrolyzed in 0.1 M HCl for 15 hours at room temperature. The silane-modified QCMs were treated with a 0.4 wt % aqueous solution of cationic polymer (Berocell 6100, molecular weight ca. 50,000, Akzo Nobel) for one hour at room temperature. Colloidal silicalite-1 crystals (average size: 60 nm) were adsorbed onto the modified QCM surface by contacting the substrates for 1 hour with a purified colloidal suspension (pH =10) of 3 wt % silicalite-1 in water. After washing several times with 0.1 M $NH_3$, the substrates were calcine in air-for 1 h at 300° C. Subsequently, the QCMs were immersed in a silicalite-1 synthesis solution. A synthesis mixture with the molar composition: 3 TPAOH: 25 $SiO_2$: 1,500 $H_2O$: 100 EtOH was heated for 20 hours in a polyethylene glycol bath at 100° C. in a polypropylene reactor, equipped with reflux cooler. The coated QCMs were calcined at 350° C. for 12 hours in oxygen flow to remove the water and organic template prior to sorption studies.

What is claimed is:

1. A method of preparing a monolayer structure comprising molecular sieve microcrystals which method comprises;
   a) preparing a dispersion comprising discrete microcrystals of molecular sieve which have a surface charge,
   b) selecting or preparing a substrate with a surface charge which is opposite to that of the discrete microcrystals in the dispersion,
   c) contacting the substrate with the dispersion comprising discrete microcrystals of molecular sieve such that discrete microcrystals of molecular sieve are attracted to and adhere to the substrate as a monolayer.

2. The method recited in claim 1, wherein the molecular sieve is zeolite or a microporous metal silicate or a metal phosphate.

3. The method recited in claim 2, wherein the molecular sieve is silicalite, hydroxysodalite, Ti-silicalite, mordenite, or one of the zeolites A, Beta, L, X, Y, ZSM-5, ZSM-2, ZSM-11, ZSM-22 or SAPO-34.

4. The method recited in claim 3, wherein the substrate is a non-porous substrate silicon, silica, aluminum oxide, aluminum silicate, titanium dioxide, zirconium dioxide, or a metal.

5. The method recited in claim 3, wherein the substrate is a porous substrate silica, zirconia, titania, aluminum oxide, aluminum silicate, metal or organic polymer substrate.

6. The method of claim 5 wherein the crystal size of said microcrystals is larger than the pore sizes of said porous support.

7. The method recited in claim 2, wherein the substrate is an inorganic or organic fiber.

8. The method recited in claim 1, wherein the microcrystals are bonded by electrostatic adsorption to a substrate surface.

9. The method recited in claim 1, wherein the substrate is pre-treated.

10. The method recited in claim 1, wherein the substrate is charge reversed.

11. The method recited in claim 10, wherein the charge reversal is achieved by contact of the substrate with a solution comprising a cationic polymer.

12. The method recited in claim 1, wherein the microcrystals are charge reversed.

13. The method recited in claim 1, wherein the microcrystals are colloidal molecular sieve microcrystals and have a particle size of 10 to 500 nm.

14. The method recited in claim 1, wherein the monolayer consists essentially of molecular sieve microcrystals which are in contact with one or more of their neighbors.

15. The method recited in claim 1, wherein the substrate comprising a monolayer of molecular sieve is calcined in steam.

16. The method of claim 1 wherein said microcrystals have a crystal size of at most 500 nm.

17. The method of claim 16 wherein said microcrystals have a crystal size of 10 to 300 nm.

18. The method of claim 17 wherein said microcrystals have a crystal size of 20 to 200 nm.

19. The method of claim 18 wherein said microcrystals have a crystal size of 20 to 120 nm.

20. The method of claim 1 further including the step:
   (d) heating said substrate having adhered microcrystals to a temperature in the range of about 200 to 1000° C. for a period of time sufficient to fix said monolayer in place on said substrate.

21. A method of preparing a structure comprising a molecular sieve film which method comprises:
   (a) depositing on a substrate a monolayer comprising molecular sieve microcrystals which are capable of nucleating the growth of a molecular sieve film, said microcrystals having a crystal size of at most 500 nm;
   (b) forming a molecular sieve synthesis solution; and
   (c) contacting (a) and (b) and hydrothermally growing molecular sieve to form a molecular sieve film on the substrate.

22. The method recited in claim 21, wherein the molecular sieve is zeolite or a microporous metal silicate or a metal phosphate.

23. The method recited in claim 22, wherein the molecular sieve is sillicalite, hydroxysodalite, Ti-silicalite, mordenite, or one of the zeolites A, Beta, L, X, Y, ZSM-5, ZSM-2, ZSM-1 1, ZSM-22, or SAPO-34.

24. The method recited in claim 23, wherein the substrate is a non-porous substrate silicon, silica, aluminum oxide, aluminum silicate, titanium dioxide, zirconium dioxide, or a metal.

25. The method recited in claim 23, wherein the substrate is a porous substrate silica, zirconia, titania, aluminum oxide, aluminum silicate, metal or organic polymer substrate.

26. The method of claim 25 wherein the crystal size of said microcrystals is larger than the pore sizes of said porous support.

27. The method recited in claim 21, wherein the substrate is an inorganic or organic fiber.

28. The method recited in claim 21, wherein the microcrystals are bonded by electrostatic adsorption to a substrate surface.

29. The method recited in claim 21, wherein the substrate is pre-treated.

30. The method recited in claim 21, wherein the substrate is charge reversed.

31. The method as claimed in claim 30, wherein the charge reversal is achieved by contact of the substrate with a solution comprising a cationic polymer.

32. The method recited in claim 21, wherein the microcrystals are charge reversed.

33. The method recited in claim 21, wherein the substrate is pre-treated by means of a coupling agent.

34. The method recited in claim 21, wherein the monolayer consists essentially of molecular sieve microcrystals which are in contact with one or more of their neighbors.

35. The method recited in claim 21, wherein the synthesis solution is clear.

36. The method recited in claim 21, wherein the substrate comprising a monolayer of molecular sieve is calcined in steam.

37. The method recited in claim 21, wherein the molecular sieve film has a thickness of less than 2 $\mu$m.

38. The method of claim 37 wherein said molecular sieve film has a thickness of less than 0.25 microns.

39. The method of claim 21 wherein said microcrystals have a crystal size of 10 to 300 nm.

40. The method of claim 39 wherein said microcrystals have a crystal size of 20 to 200 nm.

41. The method of claim 21 wherein said microcrystals have a crystal size of 20 to 120 nm.

42. The method of claim 21 wherein said contacting comprises immersion or partial immersion of said substrate in said molecular sieve synthesis solution.

43. The method of claim 21 wherein said molecular sieve synthesis solution has a molar composition within the ranges:

| | |
|---|---|
| $M_2O:SiO_2$ | 0 to 0.7:1 |
| $SiO_2:Al_2O_3$ | 12 to infinity:1 |
| $(TPA)_2O:SiO_2$ | 0 to 0.2:1 |
| $H_2O:SiO_2$ | 7 to 1000:1 | wherein TPA represents tetrapropylammonium and M is an alkali metal.

44. The method of claim 21 wherein said substrate comprising a monolayer of molecular sieve is heated to a temperature in the range of about 200 to 1000° C. for a period of time sufficient to fix said monolayer in place on said substrate prior to said contacting.

* * * * *